United States Patent [19]

Muirhead

[11] 4,405,108

[45] Sep. 20, 1983

[54] MAGNETIC TOOL RETAINING DEVICE

[76] Inventor: Walter B. Muirhead, Rte. 3, Box 260, Jasper, Tenn. 37437

[21] Appl. No.: 257,905

[22] Filed: Apr. 27, 1981

[51] Int. Cl.³ .............................................. F16B 47/00

[52] U.S. Cl. .............................. 248/206 A; 211/60 T; 211/DIG. 1; 248/221.2

[58] Field of Search ............. 248/206 A, 220.3, 220.4, 248/221.1, 221.2, 309 R; 211/60 T, DIG. 1

[56] References Cited

U.S. PATENT DOCUMENTS

| | | | |
|---|---|---|---|
| 2,657,894 | 11/1953 | Sklenar . | |
| 2,954,874 | 10/1960 | Rouse | 248/206 A |
| 3,031,930 | 5/1962 | Kafig | 248/206 A X |
| 3,154,281 | 10/1964 | Frank | 248/220.3 X |
| 3,258,237 | 6/1966 | Beiman | 211/DIG. 1 X |
| 3,405,377 | 10/1968 | Pierce | 211/60 T UX |
| 3,726,393 | 4/1973 | Thompson . | |
| 3,750,890 | 8/1973 | Smith | 211/75 |
| 3,763,996 | 10/1973 | Shepherd . | |
| 4,319,731 | 3/1982 | Pfeifer | 248/220.4 X |

*Primary Examiner*—J. Franklin Foss
*Attorney, Agent, or Firm*—King and Liles

[57] ABSTRACT

A magnetic tool retaining device for supporting wrench sockets or other ferrous tools on an upright mounting board or other surface is disclosed. The device includes a holder having a front mounting surface and rear attachment surface. A mounting post projecting outwardly from the front mounting surface includes resilient threadlike ridges for engaging and mounting a disc magnet on the front surface. The magnet has a magnetic mounting surface projecting outwardly from the holder. A lower lip projecting outwardly from the holder, beyond the magnetic face, prevents the wrench sockets from slipping off the face. Two projections project outwardly from the rear attachment surface and are dimensioned and spaced apart to engage corresponding holes in a mounting board. With the projections removed a screw received in a central opening of the mounting post can also be used to attach the device to a solid surface.

6 Claims, 6 Drawing Figures

MAGNETIC TOOL RETAINING DEVICE

BACKGROUND OF THE INVENTION

This invention generally relates to retaining devices for holding tools, such as wrench sockets or the like, in an easily accessible position; and more particularly, to a universal magnetic tool retaining device for individually supporting the same in a visible and convenient upright position on a mounting board or other conventional wall surface.

Holders for sockets are known for use in retaining a plurality of different size sockets in a single body member, to prevent the same from becoming lost or misplaced in professional and amateur workshops. Such devices typically include a holder having a plurality of differently dimensioned socket receivers, with each receiver being designed to receive a correspondingly dimensioned socket. The prior art holder carrying multiple sockets is customarily placed upon a workbench or table surface, among other tools or plans, and can be difficult to locate and also tends to clutter work space. In such locations, too, the holder may be inadvertently upset, resulting in spilling of the sockets and loss of work time.

Some attempts have been made to provide a holder tending to overcome these problems. One such attempt is found in U.S. Pat. No. 3,405,377 to Pierce, wherein there is disclosed a holder having a plurality of differently dimensioned sockets, as aforesaid, and further includes magnet means positioned at the bottom of each socket for magnetically attracting and retaining an individual socket. By positioning the magnet at the bottom of the sockets, the holder itself may be placed upon a magnetically attracted metal surface, in a vertical or inverted position, and thus is effective for locating the sockets in a more convenient location for access. While such devices are generally effective for this purpose, it is sometimes difficult to remove the sockets from the holder, particularly when strong enough magnets are being used in order to support the entire holder and sockets.

In addition, each socket can only retain one size of socket, and none larger, and are also not adapted for holding other ferrous tool implements, such as router bits, thread dies, hole saws, and the like. Further, to place the holder in a vertical position, such as upon a wall, requires the use of an additional metallic surface that must be purchased and installed on the wall to achieve the intended use.

SUMMARY OF THE INVENTION

It is accordingly an object of the present invention to provide a universal magnetic tool retaining device capable of individually supporting a tool for easy access and allowing easy removal for use.

Another object of the invention is to provide a device capable of easy and upright attachment to a wall or like surface, for supporting a tool in a visible and convenient location.

Yet another object is to provide a device capable of easy mounting and dismounting of the tool by lateral sliding movement of the tool across a magnetic face.

Still another object is to provide a device that is simple in design and economical to manufacture.

Additional objects, advantages and novel features of the invention will be set forth in detail in part in the description which follows and in part will become apparent to those skilled in the art upon examination of the drawing, or may be learned by practice of the invention. The objects and advantages of the invention may be realized and obtained by means of instrumentalities and combinations particularly pointed out in the appended claims.

The magnetic tool retaining device of the present invention is capable of individually retaining a variety of wrench sockets or other ferrous tools in a convenient and visible location upon a wall. By mounting a plurality of the devices together, an entire set of tools may be conveniently positioned for easy access. The retaining device comprises a holder having a front mounting surface and rear attachment surface. A disc magnet, dimensioned corresponding to the diameter of the front mounting surface, is attached to the mounting surface. The magnet presents a magnetic mounting face projecting outwardly from the holder, to attract and retain the tool. The mounting face has a sufficiently free edge to allow easy removal by lateral sliding movement across the edge and from the face.

A mounting post, projecting outwardly from the front mounting surface, includes resilient, threadlike annular ridges dimensioned to secure the magnet to the post and mounting surface in an interference fitting engagement. Attaching projections are provided upon the rear attachment surface, and are dimensioned and spaced apart from each other to engage corresponding holes in a mounting board for secure attachment of the holder. The projections have an interference and snap-fitting engagement with the holes. A countersunk hole, extending through the mounting post and holder, permits auxiliary attachment to the mounting board, or attachment to a plain wall surface with a screw. When the screw is used for mounting on a plain surface, the projections are simply sawed off of the back attachment surface of the device.

A lip, projecting outwardly from the lower edge of the mounting surface and beyond the magnetic mounting face, serves to prevent unusually heavy tools, such as longer than standard sockets, from sliding off the magnet by gravity. The lip also allows use of less expensive magnets to keep the cost of the retainer device desirably low.

BRIEF DESCRIPTION OF THE DRAWINGS

FIG. 1 is a perspective view of the magnetic tool retaining device according to the present invention, showing the device mounted on an upright surface for magnetically attracting and supporting a wrench socket or the like;

DETAILED DESCRIPTION OF THE INVENTION

Figure 1:
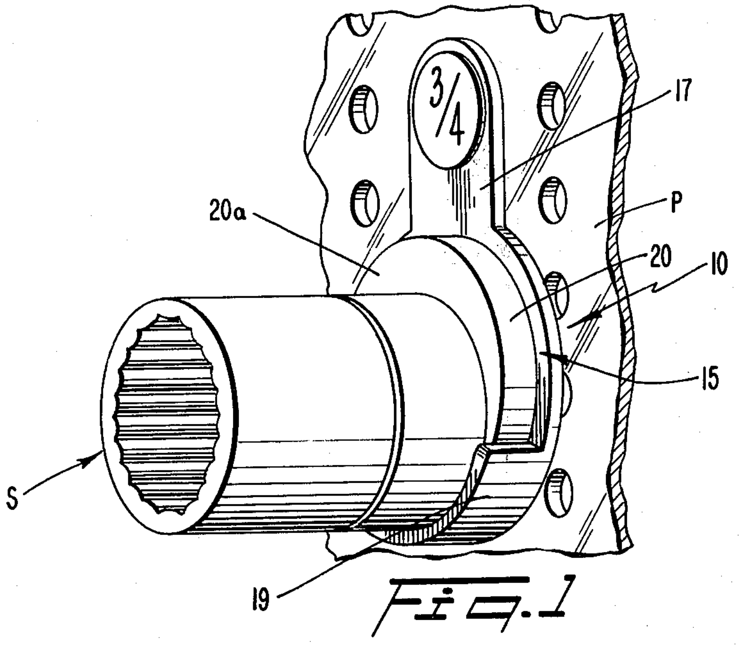

Reference will now be made in detail to the present preferred embodiment of the invention, an example of which is illustrated in the accompanying drawings. Referring first to FIG. 1, magnetic tool retaining device 10 of the invention is shown in attached and upright position to mounting board P, for supporting wrench socket S in a visible and accessible location. The retainer device 10 includes holder 15 defining a flat, circular shaped front mounting surface (FIG. 2) and rear attachment surface (FIG. 3). The holder 15 further includes an upper tab 17 and lower lip 19, as discussed more fully below. Preferably, the above portions comprising holder 15 are integrally formed from plastic or like material, by injection molding or other similar processes.

Disc magnet 20 is dimensioned for attachment to the front mounting surface and provides a magnetic mounting face 20*a* for magnetically attracting and retaining wrench socket S. To retain the magnet 20, mounting post 22 projects outwardly from the center of the mounting surface to engage center hole 26 of the magnet in interference fitting engagement. The length of the mounting post 22 is substantially the same as the thickness of the magnet to maintain a smooth magnetic mounting face 20*a* (see FIG. 6).

Figure 2:
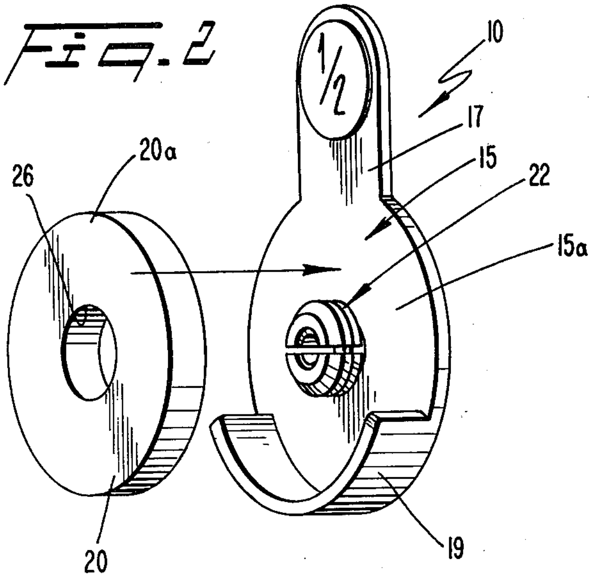
FIG. 2 is a perspective view of the retaining device showing the manner of attachment of the disc magnet to the front mounting surface of the holder.
Figure 3:
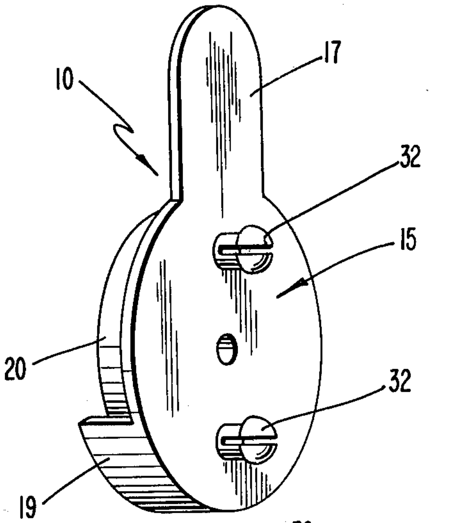
FIG. 3 is a rear, perspective view of the device showing the use of attaching projections to mount the device on mounting board.

As shown in FIGS. 2 and 3, resilient, threadlike ridges 24 extend around the outer surface of mounting post 22. The diameter of center hole 26 corresponds to a dimension intermediate the major and minor diameters of threadlike ridges 24, enabling the ridges to press outwardly against the walls of the hole to provide the interference fit when the magnet is forced down upon the post. Diametrically opposed slots 29, longitudinally formed in mounting post 22, allow the post portions defined by the slots to flex inwardly for a more secure retention of magnet 20.

Figure 4:
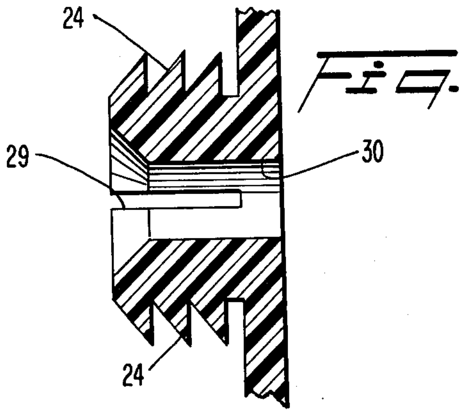
FIG. 4 is an enlarged, side view of a mounting post used for securing the magnet to the holder.
Figure 5:
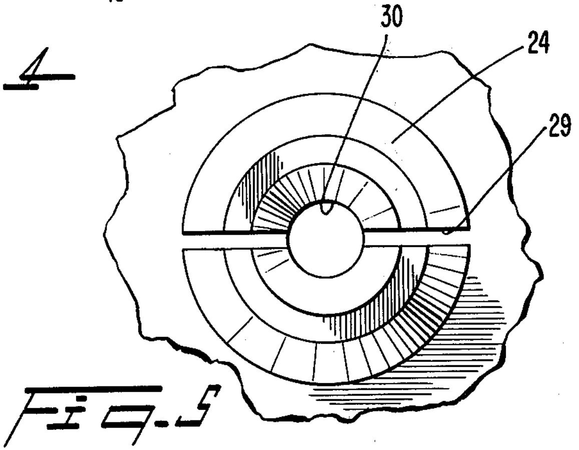
FIG. 5 is an enlarged, partial front view of the device showing the mounting post in greater detail.
Figure 6:
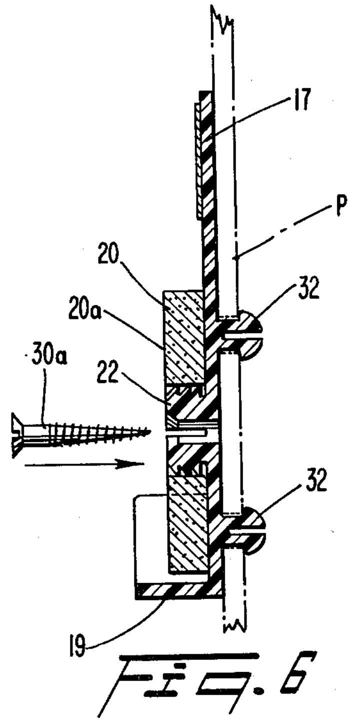
FIG. 6 is a side, cross-sectional view of the retaining device in a mounted position on an upright surface.

For securing retaining device 10 to mounting board P or other mounting surface, countersunk hole 30 is provided in mounting post 22 and extends through the central axis of the post, as shown in FIGS. 4 and 6. Flat head screw 30*a* may extend through countersunk hole 30 for attachment. Providing a countersunk hole avoids projection of the screw head into the plane defined by the magnetic mounting face 20*a* thus maintaining the desired smoothness of the face.

A pair of attaching projections 32 project outwardly from the rear attachment surface, and are spaced apart and dimensioned to fit corresponding holes in mounting board sheet P. Each projection 32 includes split portions and a retaining head larger than mounting board hole. The split portions flex inwardly as the head passes through the hole. Once through the hole the portions flex outwardly providing an interference holding relationship with the head abutting the rear surface of the mounting board for secure retention of holder 15. In this manner, device 10 may be secured in upright position to the mounting board wall without, or in combination with, screw 30*a*.

In the attached position, as shown in FIG. 1, magnetic mounting face 20*a* projects outwardly from holder 15, and includes sufficient, exposed magnetic area to attract and retain wrench socket S, while allowing removal by lateral sliding movement from the face. In addition, it will be appreciated that because magnetic mounting face 20*a* is substantially unbounded or free, the tool can be easily removed by the lateral sliding action across the edge and from the mounting face 20*a*. This feature also allows different dimensioned sockets or other ferrous tools to be retained on the retaining device 10.

Lower lip 19 projects outwardly from the lower edge of holder 15, beyond magnetic face 20*a*, and is dimensioned to provide support for the tool at the bottom. This is especially important when retaining larger than standard-size sockets. In addition, lower lip 19 enables the use of less expensive magnets by preventing the socket S from sliding off magnetic face 20*a*.

The indicia tag on the tab 17 advantageously serves as a locater for the socket S for replacement after use. The tab 17 also provides ease of handling during the initial attachment to the mounting board P or other vertical surface.

In summary, it can be seen that a simple, yet effective, universal tool retaining device 10 for ferrous metal tools is provided. The tool, such as a socket S, is magnetically held on a magnet 20 in a convenient position for easy access. The tool may be easily removed from the mounting face 20*a* by lateral sliding action across the free edge of the magnet 20. A central integral post 22 on the plastic holder 15 mounts the magnet and integral projections 32 on the back of the holder and/or a screw attach to a mounting board or the like. This simplicity of design allows low cost production while still providing exceptional holding efficiency. When used in groups and including appropriate tool indentifying indicia, the user can conveniently locate and retrieve all of his tools, as desired.

The foregoing description of the preferred embodiments of the invention have been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. A device for retaining a ferrous metal tool, such as a wrench, socket or the like for easy access on an upright surface, comprising:

a holder having a front mounting surface and rear attachment surface;

a mounting post projecting outwardly from said front mounting surface and including resilient and thread like ridges extending substantially around an outer surface of said mounting post and further including a central opening extending through said holder thereby enabling mounting of said device to a solid surface with a flat head screw or the like received through the central opening; and a magnet including a hole having an interference fit diameter receiving said mounting post, thereby enabling said magnet to be positioned upon said mounting post; said magnet having a mounting face projecting outwardly from the holder and having sufficient exposed magnetic area to attract and retain said tool; said mounting face also having a sufficiently free edge whereby said tool may be securely held on said face while allowing removal by lateral sliding movement across the edge and from said face.

2. A tool retaining device according to claim 1, wherein said mounting post further includes split portions, enabling inward flexing of the post and secure gripping engagement of the magnet mounted upon the post.

3. A tool retaining device according to claim 2, wherein said magnet is disc-shaped.

4. A tool retaining device according to claim 2, wherein said holder further includes a lip projecting outwardly from a lower edge of the mounting surface and slightly beyond the magnetic mounting face, said lip extending partially around the lower edge and being operable to prevent the tool from sliding off the magnet adjacent the bottom.

5. A tool retaining device according to claim 1, wherein is further provided a tab extending outwardly from said holder, and indicia means on said tab indicating the tool being held.

6. A tool retaining device according to claim 1, wherein said holder further includes an attaching projection secured to the rear attachment surface, said projection dimensioned to engage a hole in a mounting board in an interference or snap-fitting engagement, thereby enabling securing the device in an upright position for convenient use.

* * * * *